Jan. 19, 1971  F. HYATT  3,555,637
TENTERING CLIP AND CHAIN
Filed April 16, 1968  2 Sheets-Sheet 1
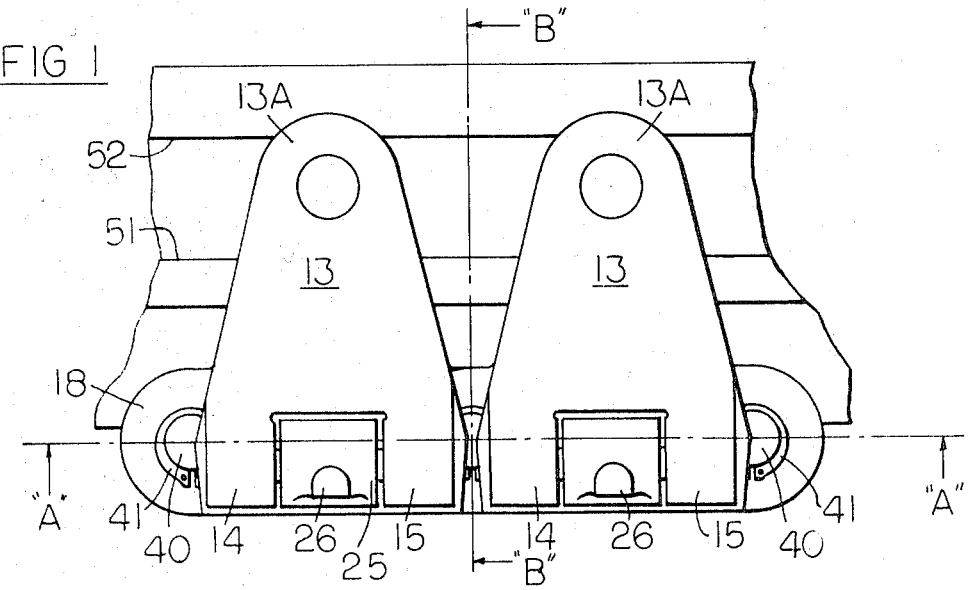
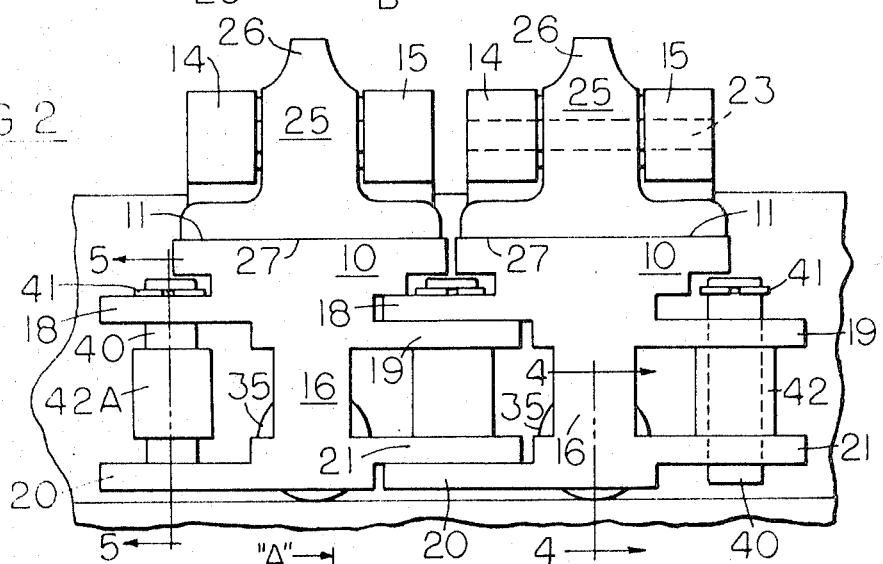
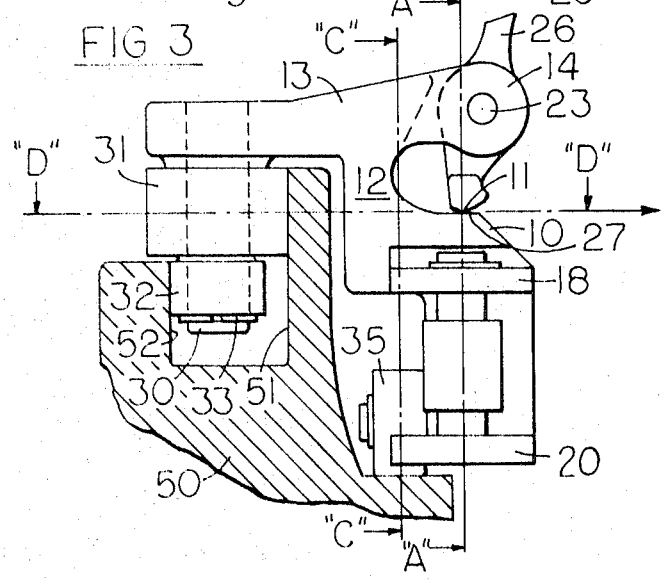
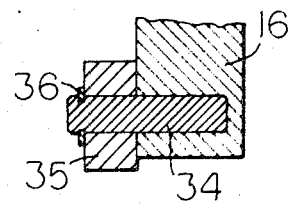
INVENTOR
FREDERICK HYATT
BY
William Frederick Werner
ATTORNEY Jan. 19, 1971   F. HYATT   3,555,637
TENTERING CLIP AND CHAIN
Filed April 16, 1968   2 Sheets-Sheet 2
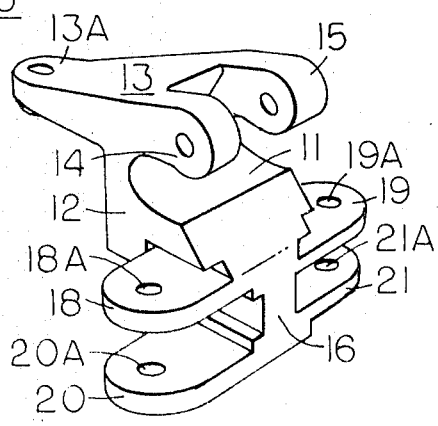
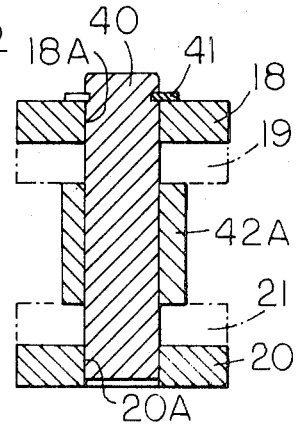
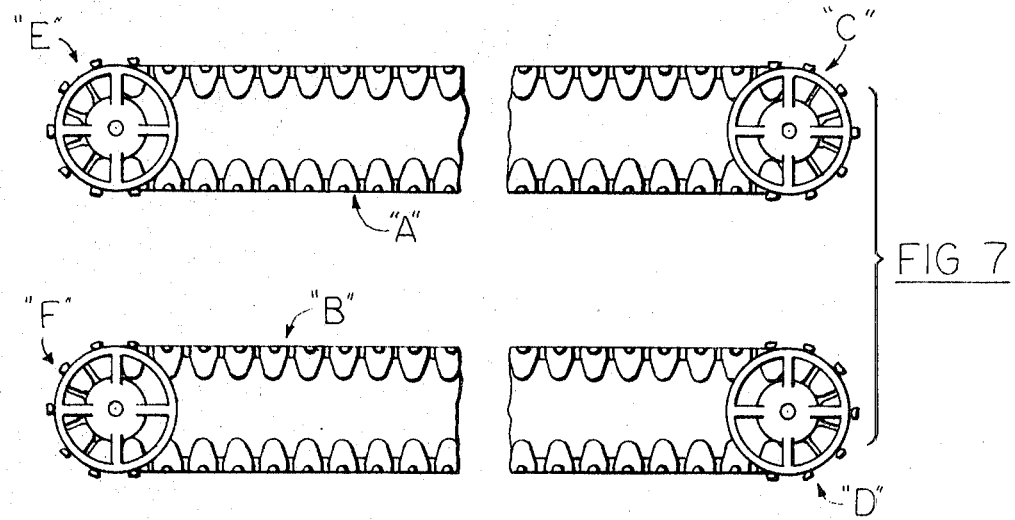
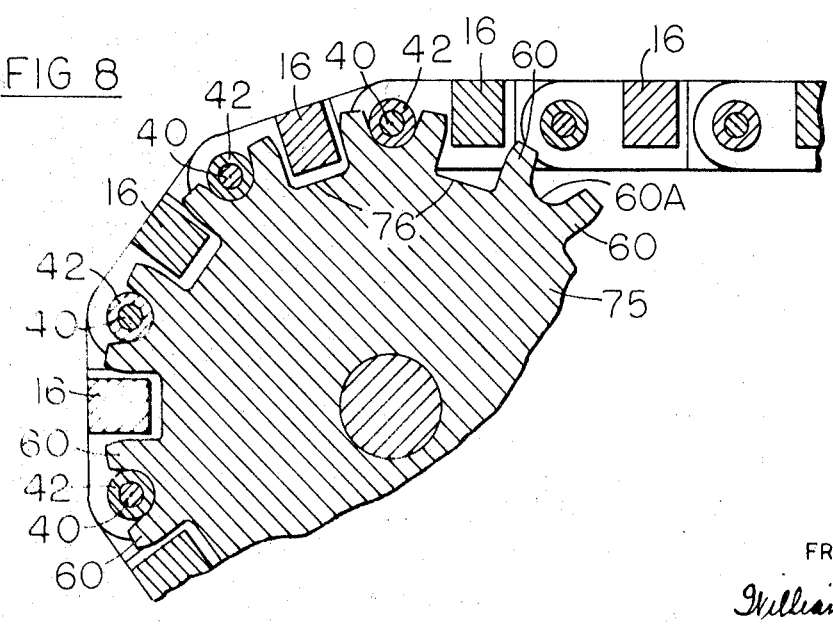
INVENTOR
FREDERICK HYATT
BY
William Frederick Warner
ATTORNEY

United States Patent Office 3,555,637
Patented Jan. 19, 1971

3,555,637
TENTERING CLIP AND CHAIN
Frederick Hyatt, Providence, R.I., assignor to Bevis Industries, Inc., Providence, R.I., a corporation of Florida
Filed Apr. 16, 1968, Ser. No. 721,752
Int. Cl. D06c 3/04
U.S. Cl. 26—62                                   7 Claims

ABSTRACT OF THE DISCLOSURE

This invention relates to tenter clips pivotally connected to form a tentering chain and specifically to a structure wherein the bite line of the jaw upon the plate is in a vertical plane passing through the pivot point of adjacent clips; adjacent clips being directly connected through a pivot pin, and adjacent clip bodies being tapered forward and aft of the vertical plane passing through the pivot pin to permit relative movement between adjacent clips.

---

The present invention relates to a new tentering clip structure and more particularly to a tentering clip structure wherein the forces acting on the clip and the frictional loading of the clip are reduced.

With the advent of processing plastic sheet material in a tenter frame, came the problem of increased forces on the tentering clip. The magnitude of the increased forces was unknown to the textile industry where tentering clips originated. The present tentering clip was inverted to cope with the greatly increased new forces.

The tentering clip in accordance with the present invention is adapted for use in stretching a variety of sheet materials, among them being thermoplastic material such as polyester or polyethylene or fluorocarbons. Such material is conventionally extruded in sheet form substantially thicker than is finally desired, and is then stretched in either one or both directions to reduce it to the desired thickness, and to orient its molecules in order to increase its strength. Such plastic material, may, according to the use to which it is to be put, range in thickness in its extruded form from a few hundredths of an inch to one-quarter inch. It is desirable that the sheet material gripping means or tenter clips of the stretching or tentering apparatus employed for processing the extruded plastic material shall be strong enough to withstand the increased stretching forces needed to stretch plastic sheeting as contrasted to cotton sheeting.

It has been found that tenter clips conventionally employed in the stretching of cloth lack the requisite structure to stretch plastic sheeting due to the increase in operational forces.

Sheet material enters one end of a tenter frame and is removed at the opposite end thereof. In between, the two rails of the frame diverge to increase the width between the two rails and thereby stretch the material. Tenter clips at the material entering end of the tenter frame travel in two parallel straight lines and grip the material on opposite sides of a horizontal plane. As the rails diverge, the tenter clips leave the two parallel straight lines of travel to travel in two divergent widening curves. The area of material between adjacent clip jaws which is not actually gripped by the tenter clip jaws is distorted during travel through the divergent widening curves. This distortion is known as scalloping when the distance between tenter clip jaws increases and is known as compressing when the distance between tenter clip jaws decreases.

It is therefore an object of the present invention to provide a tenter clip with a structure which is strong enough to withstand the constricting forces inherent in plastic sheeting while providing the structure with means to reduce the frictional forces between the tenter clip and rail.

It is another object of the present invention to provide a tenter clip structure in which scalloping and compression are eliminated.

Still another object of the present invention is to provide a sleeve roller between adjacent tenter clips which will ride in the space between sprocket teeth.

A further object of the present invention is to provide an inter-relation of ears of adjacent tenter clips, whereby the axle pins also serve as the sprocket drive pins to thereby equally distribute the drive stress directly upon the clip bodies.

In this manner, the axle pin is subjected to the pulling forces in equal amounts above and below the center of the axle pin. The drive sprocket wheel places the drive load upon the center of the axle pin through the sleeve roller.

Other objects of the present invention will be pointed out in part and become apparent in part in the following specification and claims.

Referring to the drawings in which similar characters of reference indicate corresponding parts:

FIG. 1 is a plan view of two tenter clips forming part of a tenter clip chain, with a fragmentary disclosure of the rail associated with the tenter clips.

FIG. 2 is a front elevational view of FIG. 1.

FIG. 3 is a side elevational view of FIG. 1 with the fragmentary rail section in cross section.

FIG. 4 is a fragmentary cross-sectional view taken on line 4—4 of FIG. 2, showing the construction of the tentering clip support roller.

FIG. 5 is a fragmentary cross-sectional view, taken on line 5—5 of FIG. 2.

FIG. 6 is a perspective view of the new and improved tentering clip.

FIG. 7 is a schematic view of a tentering machine.

FIG. 8 is an enlarged fragmentary plan view of a tentering machine chain and sprocket wheel.

Referring to the drawings the new and improved tentering clip comprises a horizontally disposed base 10, provided with a horizontal clamp surface 11, a vertical upstanding wall 12, a horizontal platform 13 which overhangs the vertical upstanding wall 12 to form a rearward portion 13A and a forward portion overlying said horizontal clamp surface 11 and terminating in a pair of spaced apart arms 14 and 15. Base 10 is provided with a depending central section 16.

Central section 16 is provided with a first upper ear 18 and a second upper ear 19 which project horizontally sidewise in opposite directions. The top surface of second ear 19 lies in a horizontal plane below the bottom surface of first ear 18. Central section 16 is also provided with a first lower ear 20 and a second lower ear 21 which project horizontally sidewise in opposite directions parallel, respectively, to said first upper ear 18 and second upper ear 19. The bottom surface of second lower ear 21 lies in a horizontal plane above the top surface of first lower ear 20. In this manner, as seen in FIG. 2, first upper ear 18 overlies second upper ear 19 and second lower ear 21 overlies first lower ear 20 to provide the leafs of a hinge when pivoted about axle pin 40.

Pivotally mounted between spaced apart arms 14, 15 on a pintel 23 supported in arms 14, 15 is a jaw 25 provided with a projection 26 and a clamping edge 27. Jaw 25 is loosely hinged to pintel 23, so as to be normally free to move automatically into vertical relation with horizontally disposed clamp surface 11, under the action of gravity, to provide a material clamping action between clamping edge 27 and clamp surface 11.

A stud 30 is fastened in rearward portion 13A, as by means of a drive fit. A front rail roller 31 is rotatively mounted upon stud 30. A rear rail roller 32 is also rotatively mounted upon stud 30. A spring ring 33 fastened to stud 30 removably retains rollers 31 and 32 upon stud 30.

A shaft 34 is fastened in central section 16, as by means of a drive fit. A weight support roller 35 is rotatively mounted upon shaft 34 and held thereon, by means of a snap ring 36 mounted upon shaft 34.

An axle pin 40 passes through orifices, 18A, 19A, 20A, 21A provided for that purpose in ears 18, 19, 20, 21 (see FIGS. 2, 5 and 6). A snap ring 41 having an outside diameter greater than the outside diameter of axle pin 40 is mounted upon axle pin 40 and abuts ear 18, to thereby hold axle pin 40 in position. A sleeve roller 42 is rotatively mounted upon axle pin 40 and is held in position by means of ears 19 and 21. Sleeve bearing roller 42A is identical to sleeve bearing roller 42. For purposes of illustration in FIGS. 2 and 5, it is shown in operative position, rather than the position it would assume under the force of gravity, against ear 20.

A fragmentary section of tenter frame rail 50 is shown in FIGS. 1 and 3. It will be noted that the working face of front rail roller 31 rotatively engages and travels along front rail face 51, during the material gripping cycle of the tentering clip chain. The working face of rear rail roller 32 rotatively engages and travels along rear rail surface 52 during the return tenter clip cycle.

As illustrated in FIGS. 1 and 2, a tenter chain consists of a plurality of individual tentering clips pivoted together to form an endless chain driven by a sprocket wheel (see FIGS. 7 and 8).

A tenter frame (FIG. 7) consists of two tenter chains, generally indicated by reference characters "A" and "B," two drive sprockets, generally indicated at "C" and "D," and two idler sprockets, generally indicated at "E" and "F," two parallel rails (not shown) are provided in spaced relation. The drive sprocket wheels "C" and "D" are oppositely located at one end of the rails. The cloth enters over the idler sprockets "E" and "F" end of the tenter frame to be gripped upon opposite edges by the tentering clips which are pulled toward the drive sprocket wheels "C" and "D." The tenter chains are taut in the length between the ilder sprocket wheels "E" and "F" and the drive sprocket wheels "C" and "D." During this drive cycle the working face of front rail rollers 31 bear against front rail faces 51. The material exerts a great force tending to pull the oppositely and generally parallel tentering clips toward each other. At the sprocket wheel "C" and "D" drive end of the frame the jaws of the tentering clips are pivoted by cam means (not shown) against projection 26 to release the material. Upon release of the material, the tenter chain becomes limp and travels in a limp condition from the drive sprocket wheels "C" and "D" to the idler sprocket wheels "E" and "F." During this cycle of the tenter chain the working face of rear rail rollers 32 engages rear rail surface 52 and thereby prevent the individual tentering clips from tipping away from the front rail surface 51.

The unique structural features of the present tentering clip reside in the tentering clips individually and jointly in forming a chain and in the chain in its relation to the rail.

The gripping, clamping or "bite line" of a tentering clip is the line along the clamp surface 11 at which the clamping edge 27 of the jaw 25 engages the clamp surface 11 to clamp or wedge or grip the material to be held.

In the present construction, a vertical plane "A"—"A" (FIGS. 1 and 3) passing through the "bite line" also passes through the center line of the pivot axis of the axle pins 40, pivotally connecting adjacent clips. A vertical plane "B"—"B" (FIG. 1) perpendicular to the plane "A"—"A" and located mid-way between adjacent clips, positively locates the pivot axis of axle pins 40.

The location of the pivot axis of axle pins 40 prevents distortion of plastic film between tentering clips. Adjacent clips pivot in relation, one to the other, around the axis of the axle pins 40. Since the material is gripped in a plane passing through this axis, the pivotal relation of one clip to the adjacent clip does not increase the distance between the "bite line" of adjacent clips. The distance remains constant. Therefore, plastic film in a heat softened condition is not compressed or scalloped in the area between adjacent clips.

The structure of an axle pin 40 directly connecting adjacent clips eliminates conventional tenter clip links and not only reduces the distance between adjacent clips and thereby reducing the unsupported grip area on the web but it also prevents buckling or juxtapositioning of adjacent clips. The sleeve rollers 42 ride in the space 60A between sprocket wheel teeth 60 instead of the sprocket wheel teeth 60 engaging the body of the clip. The rotation of the tenter chain around the sprocket wheel is greatly enhanced.

Vertical plane "C"—"C" (FIG. 3) passes through both the center of gravity of the mass constituting the tenter clip and the center of weight support roller 35. It is a unique feature of the present structure that the tentering clip is supported upon the rail at the center of gravity of the tentering clip.

Horizontal plane "D"—"D" passes through both the horizontal "bite line" and the center of the working face of the front rail roller 31 and is the plane through which the contraction forces of the plastic film act. The arrow on line "D—D" indicates the direction of the force exerted by the sheet material.

Further, it is readily apparent that the base and rearward portion of both sides of the clip are tapered away from the vertical plane "B"—"B" starting at the intersection of the vertical planes "A"—"A" and "B"—"B" to provide a clearance for the relative pivotal movement between adjacent clips in one direction and said base and forward portion of both sides of the clip are tapered in an opposite direction away from said intersection to provide pivotal movement between adjacent clips in an opposite direction.

FIG. 8 represents the new sprocket wheel 75 structure needed with the present, new and improved tentering clip. Clearance areas 76 alternate with sprocket teeth spaces 60A to provide for the entwining of the central section 16 of each tentering clip.

Having shown and described a preferred embodiment of the present invention by way of example, it should be realized that structural changes could be made and other examples given without departing from either the spirit or scope of this invention.

What I claim is:

1. A tenter clip comprising a horizontally disposed base provided with a clamp surface, a vertical upstanding wall, a horizontal platform which overhangs said wall to form a rearward portion and a forward portion overlying said clamp surface and terminating in a pair of spaced apart arms, said base having a depending central section provided with a pair of upper ears which project horizontally sidewise in opposite directions and a pair of lower ears which project horizontally sidewise in opposite directions parallel, respectively, to said upper ears, a pintel supported in said pair of spaced apart arms, a jaw, provided with a projection and a clamping edge, loosely hinged to said pintel between said spaced apart arms to be normally free under the action of gravity to automatically move into position, with said clamping edge engaging said clamp surface to thereby provide a horizontal bite line, axle pin bores located in said upper ears and in said lower ears, with the bore in an upper ear and lower ear aligned with each other, a vertical plane passing through said horizontal bite line also passing through the axis of said axle pin bores, axle pins located, respectively, in each upper bore and lower bore, sleeve rollers rotatively mounted respectively, on each of said axle pins and spaced from said depending central section, means securing each axle pin in said upper bore and lower bore, whereby in driving a chain composed of clips of the above type by means of a sprocket wheel, sprocket teeth spaces engage the sleeve rollers to drive the tenter clip, with a clearance area in the sprocket wheel surrounding the central section of the tentering clip.

2. A combination as called for in claim 1 wherein, a stud is provided, means fastening said stud to said rearward portion, a front rail roller having a working face, a horizontal plane passing through said bite line passing through the center line of said working face of said front rail roller, and means rotatively fastening said front rail roller to said stud.

3. A combination as called for in claim 2, wherein a shaft is provided, means fastening said shaft to said depending central section, a weight support roller having a working face, and means rotatively supporting said weight support roller to said shaft, a vertical plane passing through the center of gravity of said tenter clip also passing through the center of said working face of said weight support roller.

4. A tenter clip comprising a horizontally disposed base provided with a clamp surface, a vertical upstanding wall, a horizontal platform which overhangs said wall to form a rearward portion and a forward portion overlying said clamp surface and terminating in a pair of spaced apart arms, said base having a depending central section provided with a pair of upper ears which project horizontally sidewise in opposite directions and a pair of lower ears which project horizontally sidewise in opposite directions parallel, respectively, to said upper ears, a pintel supported in said pair of spaced apart arms, a jaw, provided with a projection and a clamping edge, loosely hinged to said pintel between said spaced apart arms to be normally free under the action of gravity to automatically move into position with said clamping edge engaging said clamp surface to thereby provide a horizontal bite line, axle pin bores located in said upper ears and in said lower ears, with the bore in an upper ear and lower ear aligned with each other, a vertical plane passing through said horizontal bite line also passing through the axis of said axle pin bores, a stud, means fastening said stud to said rearward portion, a front rail roller having a working face, a horizontal plane passing through said bite line also passing through the center line of said working face of said front rail roller, means rotatively fastening said front rail roller to said stud, a shaft means fastening said shaft to said depending central section, a weight support roller having a working face, means rotatively supporting said weight support roller to said shaft, a vertical plane passing through the center of gravity of said tenter clip also passing through the center of said working face of said weight support roller, a rear rail roller, and means for rotatively fastening said rear rail roller to said stud.

5. A tentering clip comprising a horizontally disposed base provided with a clamp surface, an upstanding wall, a horizontal platform which overhangs said wall to form a rearward portion rearwardly tapered to provide for pivotal movement of said tentering clip, and a forward portion forwardly tapered to provide for pivotal movement of said tentering clip in a direction opposite to said first mentioned pivotal movement, said forward portion overlying said clamp surface and terminating in a pair of spaced apart arms, said base having a depending central section provided with a first upper ear, having a first orifice, and a second upper ear, having a second orifice, which project horizontally sidewise in opposite directions, the top surface of said second ear lying in a horizontal plane below the bottom surface of said first ear, said central section also having a first lower ear, having a third orifice and a second lower ear, having a fourth orifice, which project horizontally sidewise in opposite directions parallel, respectively, to said first upper ear and said second upper ear, the bottom surface of said second lower ear lying in a horizontal plane above the top surface of said first lower ear, whereby the first upper ear of one clip overlies the second upper ear of an adjacent clip to axially align said first orifice with said second orifice and a second lower ear of the one clip overlies the first lower ear of an adjacent clip to axially align the fourth orifice with the third orifice to thereby provide the leafs for a hinge means between adjacent clips when pivoted about an axle pin, a pintel supported in said pair of spaced apart arms, a jaw, provided with a projection and a clamping edge, loosely hinged to said pintel to be normally free under the action of gravity to automatically move into position, with said clamping edge engaging said clamp surface to thereby provide a horizontal bite line, a vertical plane passing through said horizontal bite line also passing through the axially aligned first orifice with said second orifice and the axially aligned third orifice with said fourth orifice.

6. A tentering clip comprising a horizontally disposed base provided with a clamp surface, an upstanding wall, a horizontal platform which overhangs said wall to form a rearward portion and a forward portion overlying said clamp surface and terminating in a pair of arms, said base having a depending central section provided with a pair of upper ears which project horizontally sidewise in opposite directions and a pair of lower ears which project horizontally sidewise in opposite directions parallel, respectively, to said upper ears, a pintel supported in said pair of arms, a jaw, provided with a projection and a clamping edge, loosely hinged to said pintel to be normally free under the action of gravity to automatically move into position, with said clamping edge engaging said clamp surface to thereby provide a horizontal bite line, axle pin bores located in said upper ears and in said lower ears, with the bores in a respective upper ear and lower ear aligned with each other, a vertical plane passing through said horizontal bite line also passing through the axes of said axle pin bores, a respective upper ear and lower ear both projecting sidewise in the same horizontal sidewise direction on one tenter clip being interlockable with the respective upper ear and lower ear, both projecting sidewise in an opposite direction on an adjacent tenter clip with axle pin bores located in both upper ears and both lower ears being vertically alignable, an axle pin being locatable in all the axle pin bores, vertical planes passing through said axle pin bores at approximately ninety degrees to said vertical plane passing through said horizontal bite line determining the center of the pivot points of the clip, the base and rearward portion of both sides of the clip being tapered away from said second mentioned vertical planes starting at the intersection of said vertical plane passing through the bite line and the second mentioned vertical planes to provide clearance for relative pivotal movement between adjacent clips in one direction and said base and forward portion of both sides of the clip being tapered in an opposite direction away from said intersection to provide pivotal movement between adjacent clips in an opposite direction.

7. A plurality of tenter clips pivotally connected together to form an endless chain, each tenter clip comprising a horizontally disposed base provided with a clamp surface an upstanding wall, a horizontal platform which overhangs said wall to form a rearward portion and a forward portion which overlies said clamp surface and which terminates in a pair of spaced apart arms, said base having a depending central section provided with a pair of upper ears which project horizontally sidewise in opposite directions and a pair of lower ears which project horizontally sidewise in opposite directions parallel, respectively, to said upper ears, a pintel supported in said pair of arms, a jaw, provided with a projection and a clamping edge, loosely hinged to said pintel between said spaced apart arms to be normally free under the action of gravity to automatically move into position, with said clamping edge engaging said clamp surface to thereby provide a horizontal bite line, axle pin bores located in said upper ears and in said lower ears, with the bore in an upper ear and the bore in a lower ear vertically aligned with each other, a vertical plane passing through said horizontal bite line also passing through the axes of said axle pin bores, a respective upper ear and lower ear, both projecting sidewise in the same horizontal sidewise direction on one tenter clip embracing a respective upper ear and lower ear, both projecting sidewise in an opposite direction on an adjacent tenter clip with the axle pin bores located in both upper ears and both lower ears vertically aligned, an axle pin located in all the axle pin bores, a sleeve bearing roller rotatively mounted upon each said axle pin and supported between respective upper ears and lower ears, means securing said axle pins in said axle pin bores, a vertical plane passing between adjacent clips passing through the axis of an adjoining axle pin, and intersecting said bite line vertical plane of each clip, each said rearward portion being tapered rearwardly from said bite line vertical plane approximately eighteen degrees from said vertical planes passing between adjacent clips and each said forward portion being tapered forwardly from said bite line vertical plane approximately five degrees from said vertical planes passing between adjacent clips, the intersection of said bite line vertical planes and said vertical planes passing between adjacent clips being the axis of the axle pins and the center of the pivot point between adjacent clips, the distance between adjacent clips on said bite line being sufficient to permit relative pivotal movement between adjacent clips.

References Cited

UNITED STATES PATENTS

| | | | |
|---|---|---|---|
| 1,840,486 | 1/1932 | Butterworth, Jr. | 26—62(B) |
| 1,984,377 | 12/1934 | Krug | 26—62(B) |
| 2,530,119 | 11/1950 | Dungler | 26—61(B)(X) |
| 3,058,191 | 10/1962 | Nash | 26—62(B) |

FOREIGN PATENTS

| | | | |
|---|---|---|---|
| 346,477 | 11/1904 | France | 26—62(B) |
| 1,130,147 | 9/1956 | France | 26—62(B) |
| 584,774 | 9/1933 | Germany | 26—62(B) |
| 707,161 | 4/1954 | Great Britain | 26—62(C) |
| 1,080,915 | 8/1967 | Great Britain | 26—61(B) |

ROBERT R. MACKEY, Primary Examiner

U.S. Cl. X.R.

26—61